United States Patent
Chen et al.

(10) Patent No.: US 10,782,745 B2
(45) Date of Patent: Sep. 22, 2020

(54) CALL RECEIVING OPERATION METHOD OF ELECTRONIC SYSTEM

(71) Applicants: I-Lung Chen, Taipei (TW); Yi-Hsuan Wu, Taipei (TW); Wang-Hung Yeh, Taipei (TW); Yi-Chang Wu, Taipei (TW); Yu-Fan Chuang, Taipei (TW); Yu-Wei Lai, Taipei (TW)

(72) Inventors: I-Lung Chen, Taipei (TW); Yi-Hsuan Wu, Taipei (TW); Wang-Hung Yeh, Taipei (TW); Yi-Chang Wu, Taipei (TW); Yu-Fan Chuang, Taipei (TW); Yu-Wei Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/233,110

(22) Filed: Dec. 27, 2018

(65) Prior Publication Data
US 2019/0212790 A1 Jul. 11, 2019

Related U.S. Application Data

(60) Provisional application No. 62/610,945, filed on Dec. 28, 2017.

(51) Int. Cl.
*G06F 1/16* (2006.01)
*G06F 3/038* (2013.01)

(52) U.S. Cl.
CPC .......... *G06F 1/1698* (2013.01); *G06F 1/1632* (2013.01); *G06F 1/1688* (2013.01); *G06F 3/038* (2013.01)

(58) Field of Classification Search
CPC ....... G06F 1/1632; G06F 1/1688; G06F 3/038
See application file for complete search history.

(56) References Cited

U.S. PATENT DOCUMENTS

2005/0130593 A1* 6/2005 Michalak ............... G08B 21/24
455/66.1
2008/0070516 A1* 3/2008 Lee ......................... H04R 5/04
455/90.1

(Continued)

FOREIGN PATENT DOCUMENTS

CN 2427934 4/2001
CN 2746723 12/2005
(Continued)

OTHER PUBLICATIONS

Donald Melanson, "Brando keeps up the silly with Bluetooth PDA stylus 'headset'," May 7, 2008, Available at: https://www.engadget.com/2008/05/07/brando-keeps-up-the-silly-with-bluetooth-pda-stylus-headset/.

(Continued)

*Primary Examiner* — Tim T Vo
*Assistant Examiner* — Phong H Dang
(74) *Attorney, Agent, or Firm* — JCIPRNET

(57) ABSTRACT

An operation method of an electronic system includes the following steps. When a first communication module of the electronic device receives a call signal, a controller of an electronic device detects whether an expansion device is electrically connected to the electronic device. Based on a result of the controller detecting whether the expansion device is electrically connected to the electronic device, it is determined whether the electronic system performs sound amplification with a first speaker of the electronic device or performs playing with a second speaker of the expansion device.

9 Claims, 3 Drawing Sheets

(56) References Cited

U.S. PATENT DOCUMENTS

| | | | | |
|---|---|---|---|---|
| 2010/0020983 | A1* | 1/2010 | Waites | H04R 5/04 381/79 |
| 2010/0250817 | A1* | 9/2010 | Collopy | G06F 1/1624 710/304 |
| 2011/0098087 | A1* | 4/2011 | Tseng | G01C 21/265 455/557 |
| 2012/0046074 | A1* | 2/2012 | Gittleman | H04M 1/04 455/557 |
| 2012/0244812 | A1* | 9/2012 | Rosener | H04M 1/6066 455/41.3 |
| 2014/0274200 | A1* | 9/2014 | Olson | H04B 1/3877 455/552.1 |
| 2015/0331699 | A1* | 11/2015 | McKillop | G06F 3/165 710/14 |
| 2017/0303028 | A1* | 10/2017 | Lalvani | H04R 1/025 |

FOREIGN PATENT DOCUMENTS

| | | |
|---|---|---|
| CN | 101115081 | 1/2008 |
| CN | 101312470 | 11/2008 |
| CN | 101651735 | 2/2010 |
| CN | 101277131 | 6/2013 |
| TW | M292218 | 6/2006 |
| TW | 201004379 | 1/2010 |

OTHER PUBLICATIONS

Kit Eaton, "Brando Bluetooth Headset Stylus: Napoleon Solo Would be Jealous," May 7, 2008, Available at: https://gizmodo.com/387939/brando-bluetooth-headset-stylus-napoleon-solo-would-be-jealous.

"Office Action of Taiwan Counterpart Application," dated Dec. 6, 2019, p. 1-p. 6.

"Office Action of China Counterpart Application", dated Jul. 3, 2020, p. 1-p. 8.

* cited by examiner

CALL RECEIVING OPERATION METHOD OF ELECTRONIC SYSTEM

CROSS-REFERENCE TO RELATED APPLICATION

This application claims the priority benefit of U.S. provisional application Ser. No. 62/610,945, filed on Dec. 28, 2017. The entirety of the above-mentioned patent application is hereby incorporated by reference herein and made a part of this specification.

BACKGROUND

Technical Field

The disclosure relates to an operational method, and more particularly to an operational method of an electronic system.

Description of Related Art

With the diversification of business office types, for a business office without fixed seats, there is difficulty in answering a mobile virtual private network (MVPN) call through a fixed teleconference machine since there is no fixed seat or conference room. Therefore, how to be able to flexibly answer a mobile virtual private network call is a direction to be studied in this field.

SUMMARY

The disclosure provides an operation method of an electronic system, with which an electronic device or an expansion device can be selected to answer a call.

The disclosure provides an operation method of an electronic system, wherein the electronic system includes an electronic device and an expansion device which is optionally electrically connected to the electronic device, the operation method of the electronic system including: when a first communication module of the electronic device receives a call signal, a controller of the electronic device detects whether the expansion device is electrically connected to the electronic device; and based on the controller detecting whether the expansion device is electrically connected to the electronic device, the electronic system performs sound amplification with a first speaker of the electronic device or performs playing with a second speaker of the expansion device.

In an embodiment of the disclosure, the operation method of the electronic system further includes: when the controller detects that the expansion device is electrically connected to the electronic device, the electronic system performs sound amplification with the first speaker of the electronic device; and when the controller detects that the expansion device is not electrically connected to the electronic device, the electronic system performs playing with the second speaker of the expansion device.

In an embodiment of the disclosure, the operation method of the electronic system further includes: when the controller detects that the expansion device is not electrically connected to the electronic device, the controller of the electronic device transmits a signal to a second communication module of the electronic device so that the second communication module of the electronic device determines whether there is a wireless signal connection with a third communication module of the expansion device.

In an embodiment of the disclosure, the operation method of the electronic system further includes: when there is the wireless signal connection between the second communication module of the electronic device and the third communication module of the expansion device, the second communication module of the electronic device determines whether an answer signal sent by the third communication module of the expansion device is received; and when the second communication module of the electronic device receives the answer signal sent by the third communication module of the expansion device, the second communication module of the electronic device transmits a voice signal to the expansion device.

In an embodiment of the disclosure, in a step where the second communication module of the electronic device determines whether there is the wireless signal connection with the third communication module of the expansion device, when the second communication module of the electronic device determines that there is not the wireless signal connection with the third communication module of the expansion device, the electronic system performs a first mode of sound amplification with the electronic device.

In an embodiment of the disclosure, in a step where the second communication module of the electronic device determines whether the answer signal sent by the third communication module of the expansion device is received, when the second communication module of the electronic device determines that the answer signal sent by the third communication module of the expansion device is not received, the electronic system performs a first mode of sound amplification with the electronic device.

In an embodiment of the disclosure, after the second communication module of the electronic device transmits the voice signal to the expansion device, the following is further included: a distance detector of the expansion device detects whether a distance between the distance detector and a user exceeds a predetermined value; and when the distance between the distance detector of the expansion device and the user does not exceed the predetermined value, the electronic system performs a second mode for playing at a low volume with the expansion device.

In an embodiment of the disclosure, when the distance between the distance detector of the expansion device and the user exceeds the predetermined value, the electronic system performs a third mode of sound amplification with the expansion device.

In an embodiment of the disclosure, after the second communication module of the electronic device transmits the voice signal to the expansion device, the following is further included: when a user causes the expansion device to send a switching signal, the second communication module of the electronic device determines whether the switching signal sent by the third communication module of the expansion device is received; and when the second communication module of the electronic device receives the switching signal sent by the third communication module of the expansion device, the electronic system performs a first mode of sound amplification with the electronic device.

In an embodiment of the disclosure, when the second communication module of the electronic device does not receive the switching signal sent by the third communication module of the expansion device, the second communication module of the electronic device continues to transmit the voice signal to the expansion device.

In an embodiment of the disclosure, the switching signal is triggered by the user pressing a button on the expansion device.

In an embodiment of the disclosure, after the second communication module of the electronic device transmits the voice signal to the expansion device, the following is further included: when the user electrically reconnects the expansion device to the electronic device, the controller of the electronic device detects whether there is the wireless signal connection between the second communication module and the third communication module of the expansion device; and when the controller of the electronic device detects that there is the wireless signal connection between the second communication module and the third communication module of the expansion device, the controller sends a close signal to the second communication module to cancel the wireless signal connection between the second communication module and the third communication module, and the controller of the electronic device takes an initiative to end a call.

In an embodiment of the disclosure, after the second communication module of the electronic device transmits the voice signal to the expansion device, the following is further included: a user selects from a screen of the electronic device to end a call.

Based on the above, in the operation method of the electronic system of the disclosure, when the electronic device receives the call signal, the controller of the electronic device detects whether the expansion device is electrically connected to the electronic device. Based on the controller detecting whether the expansion device is electrically connected to the electronic device, the electronic system performs sound amplification with the first speaker of the electronic device or performs playing with the second speaker of the expansion device. That is, when the electronic device receives the call signal, if the expansion device is electrically connected to the electronic device, the electronic device is used for sound amplification. If the expansion device is not electrically connected to the electronic device, the user can answer the phone with the expansion device in a state where the expansion device is wirelessly connected to the electronic device, whereby a flexible answering way is provided.

In order to make the aforementioned features and advantages of the disclosure comprehensible, embodiments accompanied with drawings are described in detail below.

DESCRIPTION OF THE EMBODIMENTS

Figure 1:
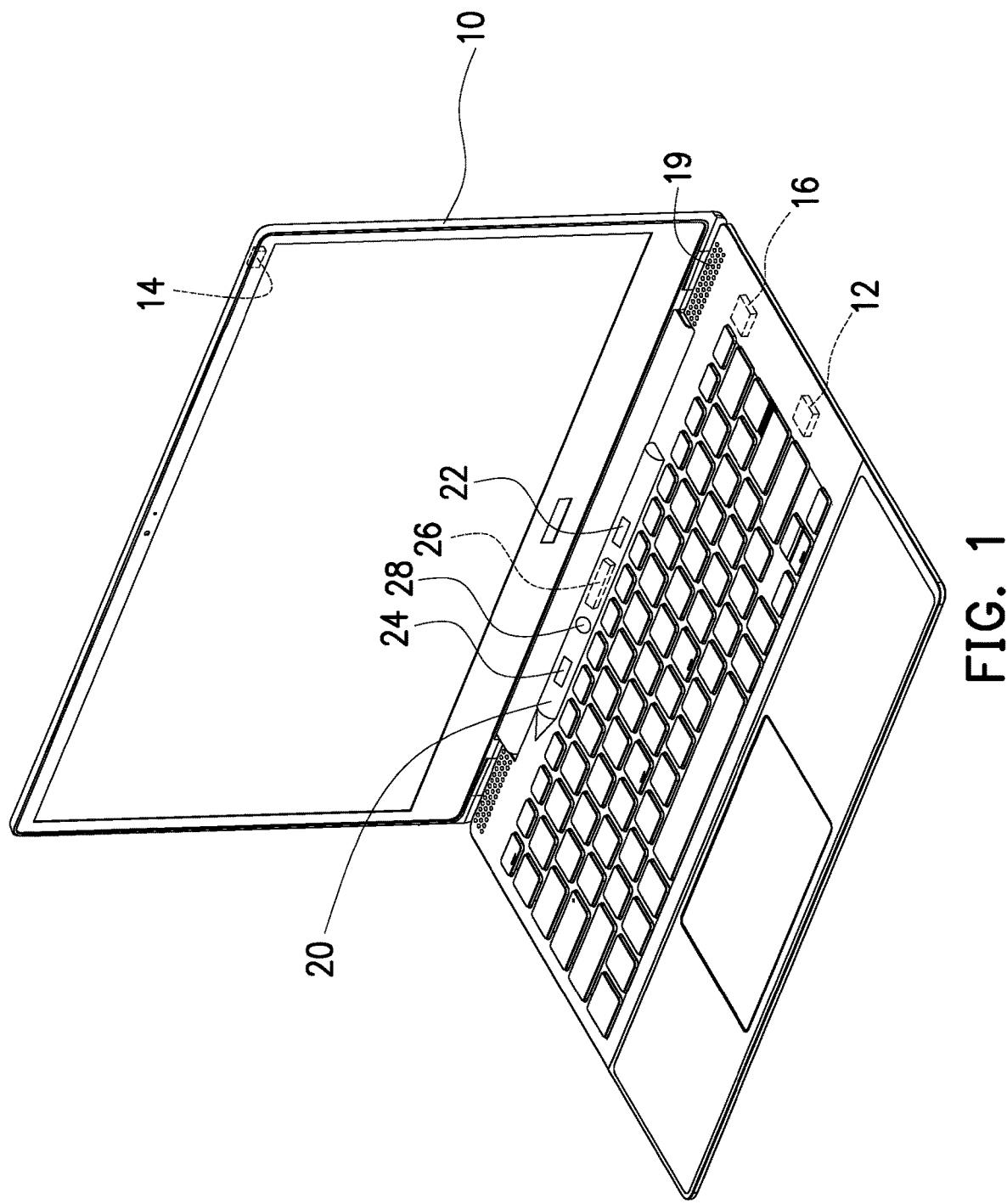
FIG. 1 is a schematic diagram of an expansion device installed on an electronic device in an electronic system according to an embodiment of the disclosure.
Figure 2:
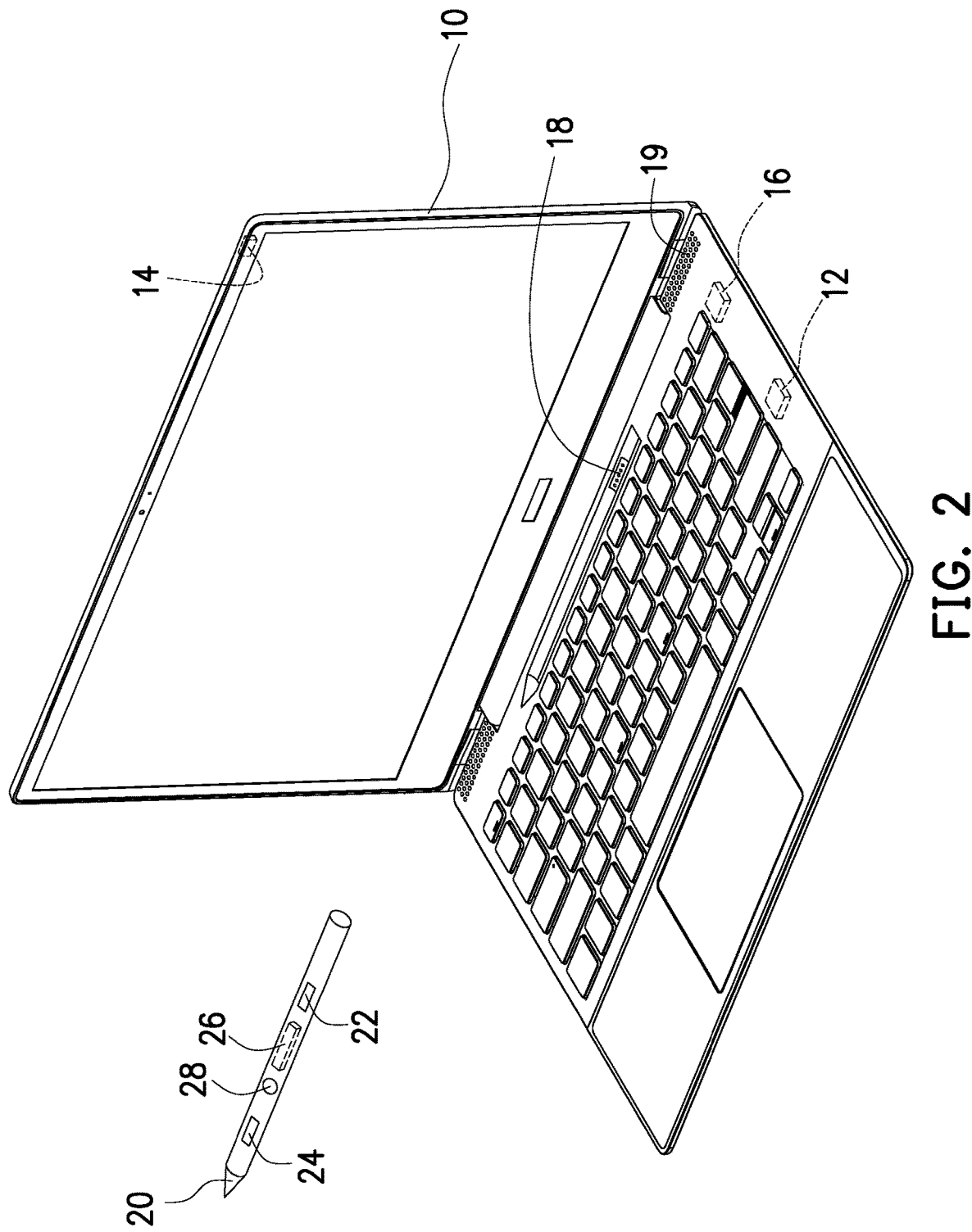
FIG. 2 is a schematic diagram of the expansion device removed from the electronic device in the electronic system according to an embodiment of the disclosure.

FIG. 1 is a schematic diagram of an expansion device installed on an electronic device in an electronic system according to an embodiment of the disclosure. FIG. 2 is a schematic diagram of the expansion device removed from the electronic device in the electronic system according to an embodiment of the disclosure. With reference to FIGS. 1 and 2, in the present embodiment, an electronic system includes an electronic device 10 and an expansion device 20 that is optionally electrically connected to the electronic device 10.

For example, the electronic device 10 is, for example, a notebook computer, and the expansion device 20 is, for example, a mobile phone (a pen-type mobile phone is illustrated in the drawings, but the form of the mobile phone is not limited thereto). Of course, the types of the electronic device 10 and the expansion device 20 are not limited thereto. In other embodiments, the electronic device 10 may be a tablet computer or a dual-screen computer, and the expansion device 20 may have other functions in addition to the mobile phone function, such as a stylus function or a recording function.

As shown in FIG. 2, in the present embodiment, the expansion device 20 may be disposed on a recess of the electronic device 10. A connection port 18 may be provided in the recess so that the expansion device 20 can be electrically connected to the electronic device 10 when installed on the electronic device 10. The electronic device 10 can charge or transmit signals to the expansion device 20 through the connection port 18.

In addition, in the present embodiment, the electronic device 10 includes a controller 12, a first communication module 16, a second communication module 14, and a first speaker 19. The controller 12 may be a central processing unit or other controllers 12 for controlling communication signals. The first communication module 16 may be configured to receive and transmit phone signals, and the second communication module 14 may be configured to wirelessly connect to a third communication module 26 of the expansion device 20. The first speaker 19 is electrically connected to the controller 12. The expansion device 20 includes a second speaker 22 and a microphone 24 and has a button 28 exposed to the surface.

The operation method of the electronic system composed of the electronic device 10 and the expansion device 20 shown in FIGS. 1 and 2 when answering a network call will be described below. Of course, the operation method of the electronic system is not limited to being applied only to the electronic system composed of the electronic device 10 and the expansion device 20 shown in FIGS. 1 and 2.

Figure 3:
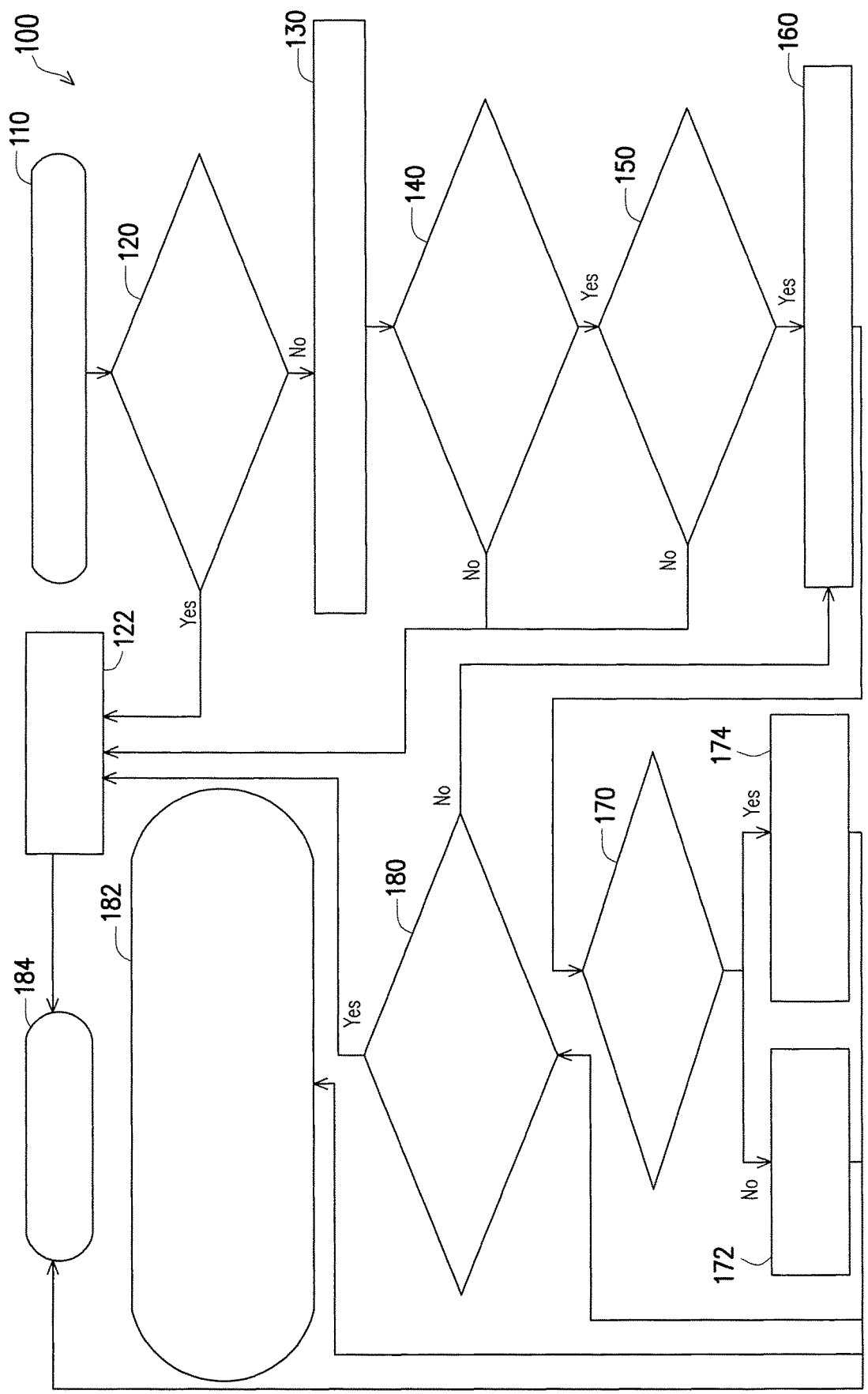
FIG. 3 is a schematic flow chart of an operation method of the electronic system according to an embodiment of the disclosure.

FIG. 3 is a schematic flow chart of an operation method of the electronic system according to an embodiment of the disclosure. With reference to FIGS. 1 to 3, the operation method of the electronic system of the present embodiment includes the following steps. First, the first communication module 16 of the electronic device 10 receives a call signal (Step 110). In the present embodiment, the first communication module 16 is configured to receive a network call, but in other embodiments, the first communication module 16 may receive other forms of calls.

Next, the controller 12 of the electronic device 10 detects whether the expansion device 20 is electrically connected to the electronic device 10 (Step 120). The electronic system performs sound amplification with the first speaker 19 of the electronic device 10 or performs playing with the second speaker 22 of the expansion device 20. In the present embodiment, when the expansion device 20 is installed on the recess of the electronic device 10, the expansion device 20 is electrically connected to the electronic device 10. Then, when the controller 12 detects that the expansion device 20 is electrically connected to the electronic device 10, the electronic system performs a first mode of sound amplification with the electronic device 10 (Step 122). In other words, in this state, the electronic device 10 (that is, the notebook computer) acts as a teleconference machine, and the first speaker 19 can amplify the voice signal.

On the contrary, when the controller 12 detects that the expansion device 20 is not electrically connected to the electronic device 10, the controller 12 of the electronic device 10 transmits a signal to the second communication module 14 of the electronic device 10 (Step 130). The second communication module 14 of the electronic device 10 determines whether there is a wireless signal connection with the third communication module 26 of the expansion device 20 (Step 140). In the present embodiment, the second communication module 14 of the electronic device 10 and the third communication module 26 of the expansion device 20 are, for example, Bluetooth modules but are not limited thereto. In other words, when the expansion device 20 is not on the electronic device 10, the electronic device 10 checks whether there is a wireless (Bluetooth) connection with the expansion device 20.

In the present embodiment, when the second communication module 14 of the electronic device 10 determines that there is not the wireless signal connection with the third communication module 26 of the expansion device 20, the electronic system performs the first mode of sound amplification with the electronic device 10. That is, if there is not the wireless connection between the electronic device 10 and the expansion device 20, the call signal received by the electronic device 10 cannot be transmitted to the expansion device 20, so the call signal received by the electronic device 10 is still amplified and played by the electronic device 10.

On the contrary, when there is the wireless signal connection between the second communication module 14 of the electronic device 10 and the third communication module 26 of the expansion device 20, the second communication module 14 of the electronic device 10 determines whether an answer signal sent by the third communication module 26 of the expansion device 20 is received (Step 150). In the present embodiment, the answer signal sent by the third communication module 26 of the expansion device 20 is, for example, a signal triggered by a user pressing the button 28 on the expansion device 20 but is not limited thereto.

When the second communication module 14 of the electronic device 10 determines that the answer signal sent by the third communication module 26 of the expansion device 20 is not received, the electronic system performs the first mode of sound amplification with the electronic device 10. This means that the user does not intend to answer the call from the expansion device 20. Therefore, the call signal received by the electronic device 10 is still amplified and played by the electronic device 10.

On the contrary, when the second communication module 14 of the electronic device 10 receives the answer signal sent by the third communication module 26 of the expansion device 20, the second communication module 14 of the electronic device 10 transmits a voice signal to the expansion device 20 (Step 160). That is, the user sends the answer signal by, for example, pressing the button 28 on the expansion device 20, and the electronic device 10 transmits the voice signal to the expansion device 20 for playing after receiving the answer signal. In other words, in this state, the expansion device 20 acts as a teleconference machine to amplify the voice signal.

Therefore, the electronic system of the present embodiment can allow the user to select whether to answer the call with the electronic device 10 or with the expansion device 20, thereby increasing the flexibility in use. At least one of the electronic device 10 and the expansion device 20 may be a portable device so that a business man without a fixed seat can answer a network conference call through the electronic system of the present embodiment.

Of course, in other embodiments, the electronic system may be operated in a way in which when the controller 12 detects that the expansion device 20 is electrically connected to the electronic device 10, the electronic system performs sound amplification with the first speaker 19 of the electronic device 10. When the controller 12 detects that the expansion device 20 is not electrically connected to the electronic device 10, the electronic system performs playing with the second speaker 22 of the expansion device 20. The operation way of the electronic system is not limited to FIG. 3.

It should be noted that, in the present embodiment, after the second communication module 14 of the electronic device 10 transmits the voice signal to the expansion device 20, the operation method of the electronic system may optionally include the following steps. First, a distance detector of the expansion device 20 detects whether a distance between the distance detector and a user exceeds a predetermined value (Step 170). The distance detector detects, for example, the distance between the expansion device 20 and the face of the user. The distance detector is, for example, an infrared detector, but the type of the distance detector is not limited thereto.

In the present embodiment, when the distance between the distance detector of the expansion device 20 and the user does not exceed the predetermined value, the electronic system performs a second mode for playing at a low volume with the expansion device 20 (Step 172). On the contrary, when the distance between the distance detector of the expansion device 20 and the user exceeds the predetermined value, the electronic system performs a third mode of sound amplification with the expansion device 20 (Step 174).

In detail, if the distance between the expansion device 20 and the face of the user does not exceed the predetermined value, it means that the expansion device 20 is very close to the face of the user. At this time, the volume of the expansion device 20 may be like the volume of a general mobile phone. If the distance between the expansion device 20 and the face of the user is greater than the predetermined value, it means that the expansion device 20 is located at a distance from the face of the user. At this time, in order to enable the user to clearly hear the voice content, the expansion device 20 automatically converts to the volume of sound amplification (or micro-sound-amplification).

In addition, in the present embodiment, when the user intends to answer the call with the electronic device 10 instead, the user may, for example, press the button 28 on the expansion device 20 to switch the object of answering. Of course, the way in which the expansion device 20 sends a switching signal is not limited thereto. The operation method of the electronic system may optionally include the following steps. When the user causes the expansion device 20 to send the switching signal, the second communication module 14 of the electronic device 10 determines whether the switching signal sent by the third communication module 26 of the expansion device 20 is received (Step 180). When the second communication module 14 of the electronic device 10 receives the switching signal sent by the third communication module 26 of the expansion device 20, the electronic system performs the first mode of sound amplification with the electronic device 10.

On the contrary, in the present embodiment, when the second communication module 14 of the electronic device 10 does not receive the switching signal sent by the third communication module 26 of the expansion device 20, the second communication module 14 of the electronic device 10 continues to transmit the voice signal to the expansion device 20.

In addition, in the present embodiment, after the second communication module 14 of the electronic device 10 transmits the voice signal to the expansion device 20, if the user intends to end the call, the user may electrically reconnect the expansion device 20 to the electronic device 10. That is, the user may reinsert the expansion device 20 back into the electronic device 10 to electrically connect the expansion device 20 to the electronic device 10. At this time, the controller 12 of the electronic device 10 detects whether there is the wireless signal connection between the second communication module 14 and the third communication module 26 of the expansion device 20. When the controller 12 of the electronic device 10 detects that there is the wireless signal connection between the second communication module 14 and the third communication module 26 of the expansion device 20, the controller 12 sends a close signal to the second communication module 14 to cancel the wireless signal connection between the second communication module 14 and the third communication module 26, and the controller 12 of the electronic device 10 takes an initiative to end the call (Step 182). Of course, the way of ending the call is not limited to the above. In the present embodiment, if the user intends to end the call, the user may choose to select from a screen of the electronic device 10 to end the call (Step 184).

In summary of the above, in the operation method of the electronic system of the disclosure, when the electronic device receives the call signal, the controller of the electronic device detects whether the expansion device is electrically connected to the electronic device. When the controller detects that the expansion device is electrically connected to the electronic device, the electronic system performs the first mode of sound amplification with the electronic device. When the controller detects that the expansion device is not electrically connected to the electronic device, the electronic device determines whether there is the wireless signal connection with the expansion device. If so, the electronic device determines whether the answer signal (such as a signal triggered by the user pressing the button on the expansion device) of the expansion device is received. If so, the second communication module of the electronic device transmits the voice signal to the expansion device. That is, when the electronic device receives the call signal, if the expansion device is electrically connected to the electronic device, the electronic device is used for sound amplification. If the expansion device is not electrically connected to the electronic device, the user can answer the phone with the expansion device in a state where the expansion device is wirelessly connected to the electronic device, whereby a flexible answering way is provided.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An operation method of an electronic system, wherein the electronic system comprises an electronic device and an expansion device which is optionally electrically connected to the electronic device, the operation method of the electronic system comprising:

when a first communication module of the electronic device receives a call signal, a controller of the electronic device detecting whether the expansion device is electrically connected to the electronic device;

based on a result of the controller detecting whether the expansion device is electrically connected to the electronic device, determining whether the electronic system performs sound amplification with a first speaker of the electronic device or performs playing with a second speaker of the expansion device;

when the controller detects that the expansion device is electrically connected to the electronic device, the electronic system performing sound amplification with the first speaker of the electronic device;

when the controller detects that the expansion device is not electrically connected to the electronic device, the electronic system performing playing with the second speaker of the expansion device;

when the controller detects that the expansion device is not electrically connected to the electronic device, the controller of the electronic device transmitting a signal to a second communication module of the electronic device so that the second communication module of the electronic device determines whether there is a wireless signal connection with a third communication module of the expansion device;

when there is the wireless signal connection between the second communication module of the electronic device and the third communication module of the expansion device, the second communication module of the electronic device determining whether an answer signal sent by the third communication module of the expansion device is received; and when the second communication module of the electronic device receives the answer signal sent by the third communication module of the expansion device, the second communication module of the electronic device transmitting a voice signal to the expansion device, wherein in a step where the second communication module of the electronic device determines whether there is the wireless signal connection with the third communication module of the expansion device, when the second communication module of the electronic device determines that there is not the wireless signal connection with the third communication module of the expansion device, the electronic system performs a first mode of sound amplification with the electronic device.

2. The operation method of the electronic system according to claim 1, wherein in a step where the second communication module of the electronic device determines whether the answer signal sent by the third communication module of the expansion device is received, when the second communication module of the electronic device determines that the answer signal sent by the third communication module of the expansion device is not received, the electronic system performs a first mode of sound amplification with the electronic device.

3. The operation method of the electronic system according to claim 1, after the second communication module of the electronic device transmits the voice signal to the expansion device, further comprising:

a distance detector of the expansion device detecting whether a distance between the distance detector and a user exceeds a predetermined value; and when the distance between the distance detector of the expansion device and the user does not exceed the predetermined value, the electronic system performing a second mode for playing at a low volume with the second speaker of the expansion device.

4. The operation method of the electronic system according to claim 3, wherein when the distance between the distance detector of the expansion device and the user exceeds the predetermined value, the electronic system performs a third mode of sound amplification with the second speaker of the expansion device.

5. The operation method of the electronic system according to claim 1, after the second communication module of the electronic device transmits the voice signal to the expansion device, further comprising:
when a user causes the expansion device to send a switching signal, the second communication module of the electronic device determining whether the switching signal sent by the third communication module of the expansion device is received; and
when the second communication module of the electronic device receives the switching signal sent by the third communication module of the expansion device, the electronic system performing a first mode of sound amplification with the electronic device.

6. The operation method of the electronic system according to claim 5, wherein when the second communication module of the electronic device does not receive the switching signal sent by the third communication module of the expansion device, the second communication module of the electronic device continues to transmit the voice signal to the expansion device.

7. The operation method of the electronic system according to claim 5, wherein the switching signal is triggered by the user pressing a button on the expansion device.

8. The operation method of the electronic system according to claim 1, after the second communication module of the electronic device transmits the voice signal to the expansion device, further comprising:
when a user electrically reconnects the expansion device to the electronic device, the controller of the electronic device detecting whether there is the wireless signal connection between the second communication module and the third communication module of the expansion device; and
when the controller of the electronic device detects that there is the wireless signal connection between the second communication module and the third communication module of the expansion device, the controller sending a close signal to the second communication module to cancel the wireless signal connection between the second communication module and the third communication module, and the controller of the electronic device taking an initiative to end a call.

9. The operation method of the electronic system according to claim 1, after the second communication module of the electronic device transmits the voice signal to the expansion device, further comprising:
a user selecting from a screen of the electronic device to end a call.

* * * * *